United States Patent [19]

Tsuzuku

[11] Patent Number: 5,595,156
[45] Date of Patent: Jan. 21, 1997

[54] INDUCTION CONTROL SYSTEM FOR MULTI-VALVE ENGINE

[75] Inventor: Hiroyuki Tsuzuku, Iwata, Japan

[73] Assignee: Yamaha Hatsudoki Kabushiki Kaisha, Iwata, Japan

[21] Appl. No.: 504,256

[22] Filed: Jul. 19, 1995

[30] Foreign Application Priority Data

Jul. 20, 1994 [JP] Japan ................... 6-168116

[51] Int. Cl.⁶ ................................. F02B 31/00
[52] U.S. Cl. ........................... 123/306; 123/308
[58] Field of Search ................... 123/306, 308, 123/432, 188.14

[56] References Cited

U.S. PATENT DOCUMENTS

| | | |
|---|---|---|
| 1,727,265 | 3/1929 | Aseltine ......................... 261/41.3 |
| 3,318,292 | 5/1967 | Hideg ............................ 123/308 |
| 3,408,992 | 11/1968 | Seggern et al. ................. 123/188.14 |
| 4,174,686 | 11/1979 | Shimizu et al. ................. 123/188.14 |
| 4,228,772 | 10/1980 | Bakonyi ......................... 123/403 |
| 4,240,387 | 12/1980 | Motosugi et al. ............... 123/308 |
| 4,256,062 | 3/1981 | Schafer .......................... 123/188.14 |
| 4,269,153 | 5/1981 | Kunii et al. .................... 123/308 |
| 4,286,561 | 9/1981 | Tsutsumi ........................ 123/432 |
| 4,308,830 | 1/1982 | Yamada et al. ................. 123/188.14 |
| 4,320,725 | 3/1982 | Rychlik .......................... 123/188.14 |
| 4,354,463 | 10/1982 | Otani et al. ..................... 123/308 |
| 4,371,438 | 3/1982 | Yagi et al. ...................... 123/432 |
| 4,413,598 | 11/1983 | Tsutsumi ........................ 123/306 |
| 4,428,334 | 1/1984 | Klomp ............................ 123/188.14 |
| 4,452,218 | 6/1984 | Yokoyama et al. .............. 123/579 |
| 4,499,868 | 2/1985 | Kanda et al. ................... 123/188.14 |
| 4,543,931 | 10/1985 | Hitomi et al. .................. 123/308 |
| 4,663,938 | 5/1987 | Colgate .......................... 60/620 |
| 4,669,434 | 6/1987 | Okumura et al. ............... 123/308 |
| 4,700,669 | 10/1987 | Sakurai et al. ................. 123/188.14 |
| 4,704,996 | 11/1987 | Morikawa ...................... 123/188.14 |
| 4,714,063 | 12/1987 | Oda et al. ...................... 123/308 |
| 4,719,886 | 1/1988 | Kotani et al. ................... 123/308 |
| 4,753,200 | 6/1988 | Kawamura et al. ............. 123/188.14 |
| 4,762,102 | 8/1988 | Kanda ............................ 123/188.14 |
| 4,779,594 | 10/1988 | Oda et al. ...................... 123/432 |
| 4,827,883 | 5/1989 | Khalighi et al. ................ 123/308 |
| 4,834,035 | 5/1989 | Shimada et al. ................ 123/188.14 |
| 4,930,468 | 6/1990 | Stockhausen .................. 123/188.14 |
| 4,974,566 | 12/1990 | LoRusso et al. ................ 123/308 |
| 4,995,359 | 2/1991 | Yokoyama et al. ............. 123/188.14 |
| 4,998,518 | 3/1991 | Mitsumoto ..................... 123/306 |
| 5,487,365 | 1/1996 | Isaka .............................. 123/306 |

FOREIGN PATENT DOCUMENTS

| | | |
|---|---|---|
| 0054964 | 6/1982 | European Pat. Off. . |
| 0068481 | 1/1983 | European Pat. Off. . |
| 0074202 | 3/1983 | European Pat. Off. . |
| 0076632 | 4/1983 | European Pat. Off. . |
| 0221312 | 5/1987 | European Pat. Off. . |
| 0235288 | 9/1987 | European Pat. Off. . |
| 449240 | 10/1991 | European Pat. Off. . |
| 2569227 | 8/1986 | France . |
| 2709519 | 9/1977 | Germany . |
| 3429414 | 2/1985 | Germany . |

(List continued on next page.)

OTHER PUBLICATIONS

European Search Report dated Oct. 5, 1992 w/Patent Abstract.
European Search Report dated Nov. 23, 1992 w/Patent Abstract.

*Primary Examiner*—Willis R. Wolfe
*Attorney, Agent, or Firm*—Knobbe, Martens, Olson & Bear, LLP

[57] ABSTRACT

A number of embodiments of multiple intake valve internal combustion engines that permit the generation of tumble in one direction and at a high velocity under one engine running condition and counter tumble at a lower velocity but in a higher flow volume under other running conditions. The system includes an arrangement for disabling the operation of at least one of the intake passages and for redirecting the flow through another of the intake passages. Embodiments having two, three, and four intake valves per cylinder are disclosed.

27 Claims, 10 Drawing Sheets

FOREIGN PATENT DOCUMENTS

| | | |
|---|---|---|
| 3638021 | 5/1987 | Germany . |
| 51-54007 | 12/1976 | Japan . |
| 56-43428 | 4/1981 | Japan . |
| 56-139829 | 10/1981 | Japan . |
| 595767 | 2/1984 | Japan . |
| 59-120718 | 7/1984 | Japan . |
| 60-11206 | 3/1985 | Japan . |
| 61-12940 | 1/1986 | Japan . |
| 61-28715 | 2/1986 | Japan . |
| 61-144223 | 9/1986 | Japan . |
| 63-32122 | 2/1988 | Japan . |
| 63-73532 | 2/1988 | Japan . |
| 63-73534 | 5/1988 | Japan . |
| 2115922 | 9/1990 | Japan . |
| 2230920 | 9/1990 | Japan . |
| 60523 | 2/1948 | Netherlands . |
| 652671 | 5/1951 | United Kingdom . |
| 1135482 | 12/1968 | United Kingdom . |
| 1293772 | 10/1972 | United Kingdom . |
| 1457152 | 12/1976 | United Kingdom . |
| 2016081 | 9/1979 | United Kingdom . |
| 2027796 | 2/1980 | United Kingdom . |
| 2064646 | 6/1981 | United Kingdom . |
| 2079763 | 1/1982 | United Kingdom . |
| 2087480 | 5/1982 | United Kingdom . |
| 2107780 | 5/1983 | United Kingdom . |
| 2196386 | 4/1988 | United Kingdom . |
| 2196388 | 4/1988 | United Kingdom . |
| 2242226 | 9/1991 | United Kingdom . |
| 7900501 | 8/1979 | WIPO . |
| 9114858 | 10/1991 | WIPO . |

INDUCTION CONTROL SYSTEM FOR MULTI-VALVE ENGINE

BACKGROUND OF THE INVENTION

This invention relates to an induction control system for a multi-valve engine and more particularly to an induction system for engines that improves the performance throughout the engine speed and load ranges.

As is well known, turbulence in the combustion chamber of an internal combustion engine is a factor which can improve engine performance under some running conditions. However, like many other factors in engine design, the type and degree of turbulence desirable varies with engine running conditions.

There have been proposed, therefore, arrangements where the induction system is tuned and utilizes a control valve so that the degree of turbulence in the combustion chamber under different running conditions can be changed. For the most part, these systems provide either a first condition where there is turbulence and a second condition where the flow into the combustion chamber is relatively smooth and little or no turbulence is generated.

Some systems have been proposed in which one type of turbulence is generated under some running conditions and another type of turbulence may be generated under other running conditions. For example, induction systems have been proposed which generate swirl under some running conditions and tumble under other running conditions. As is well known, swirl is a motion in the combustion chamber wherein the intake charge tends to rotate about the cylinder bore axis. Tumble is a swirling motion that also occurs in the combustion chamber but the axis around which the swirl is created extends transversely to the cylinder bore axis.

This latter type of motion (tumble) is particularly advantageous because the degree of turbulence increases as the piston approaches top, dead-center conditions. That is, the tumbling charge in the combustion chamber has its velocity increased as the volume of the combustion chamber decreases.

It is, therefore, a principal object of this invention to provide an improved induction system for an internal combustion engine wherein the induction system can be operated so as to achieve different types of tumble in the combustion chamber under different running conditions.

It is a further object of this invention to provide an induction system for an engine wherein tumble in one direction may be generated under one running condition and tumble in an opposite direction may be generated under another running condition.

It has been found that the generation of different types or degrees of motion in the combustion chamber can be accomplished if each combustion chamber is provided with two or more intake valves and/or ports. It is, however, considerably easier to vary swirl through the use of multiple intake ports than it is tumble. One reason for this is that the tumble motion is dependent to a large extent on the location of the intake port relative to a plane containing the cylinder bore axis. The closer the port is to the cylinder bore axis the more easily tumble in one direction can be generated. If the intake port is, however, disposed so that it is further from the plane, than tumble in an opposite direction may be generated. Therefore, when valves having different placements relative to such a plane are employed for the same combustion chamber, the motion generated from one intake port may cancel out or reduce the effectiveness of the tumble from the other intake port.

It is, therefore, a still further object of this invention to provide an improved multiple port induction system for an engine wherein the desired degrees of turbulence can be generated without interfering action between the intake ports.

SUMMARY OF THE INVENTION

A first feature of this invention is adapted to be embodied in an internal combustion engine having a cylinder block defining a cylinder bore in which a piston reciprocates. A cylinder head closes the cylinder bore and forms a combustion chamber at least in part with the cylinder bore and piston. Induction passage means introduce at least an air charge into the combustion chamber. Control means cooperate with the induction passage means for selectively generating a tumble in said combustion chamber in either one of two directions.

Another feature of the invention is adapted to be embodied in an internal combustion engine having a cylinder block defining a cylinder bore in which a piston reciprocates. A cylinder head closes the cylinder bore and forms a combustion chamber at least in part with the cylinder bore and piston. A first intake port is disposed for delivering a charge to the combustion chamber. The first intake port and its associated induction passage are oriented for generating a motion into the combustion chamber in a first direction. A second intake port and associated intake passage also is formed in the cylinder head and enters the combustion chamber in a direction so as to introduce the charge into the combustion chamber in a direction different from the first direction. Control means are provided for controlling the flow through at least one of the ports for controlling the direction of motion of the intake charge in the combustion chamber.

BRIEF DESCRIPTION OF THE DRAWINGS

FIG. 3 shows the control valve associated with the center intake valve in its closed flow redirecting position as shown in FIG. 1. FIG. 4 shows this valve in its opened position.

DETAILED DESCRIPTION OF THE PREFERRED EMBODIMENTS OF THE INVENTION

Figure 1:
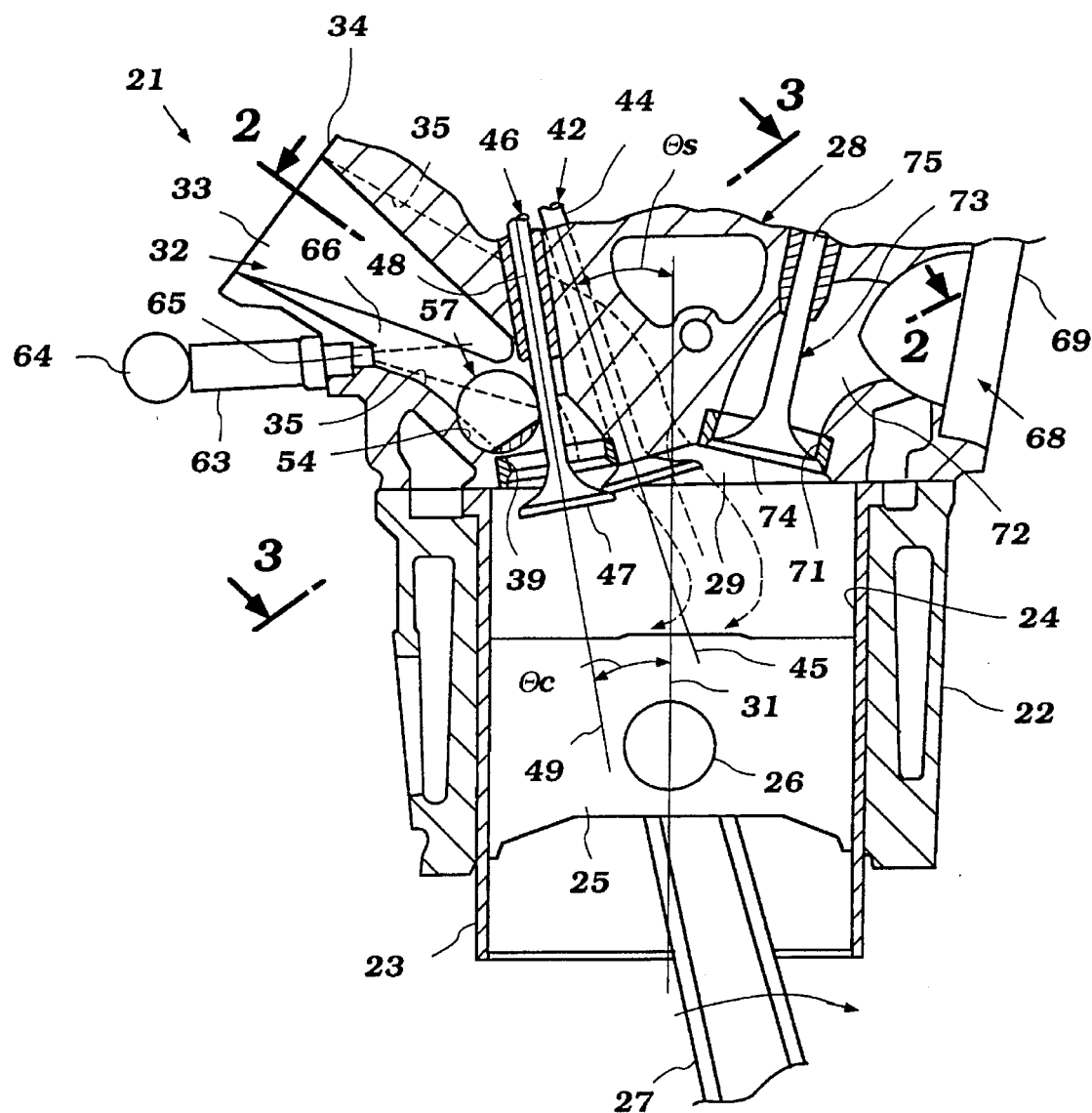
FIG. 1 is a partial cross-sectional view taken through one cylinder of a multi-cylinder internal combustion engine constructed in accordance with a first embodiment of the invention.

The first embodiment of the invention is illustrated in FIGS. 1–9 and will be described by particular reference thereto. The description initially will center on FIGS. 1–7 and in these and the remaining figures, an internal combustion engine, indicated generally by the reference numeral 21 is depicted partially. The engine 21 is shown only partially because the invention deals primarily with the combustion chamber, the induction system and the porting arrangement, including the valves, for controlling the flow into and out of the combustion chamber of the engine. Thus, where any components of the engine 21 are not illustrated or are not described in any detail, they may be considered to be conventional.

The engine 21 includes a cylinder block 22 which may be formed from a lightweight material such as aluminum, aluminum alloys or the like. The cylinder block 22 is formed with a plurality of openings in which cylinder liners 23 are inserted and which form cylinder bores 24. It is to be understood that the invention is described only in conjunction with a single cylinder bore 24 because those skilled in the art will readily understand how the invention may be practiced with multiple cylinder engines of any configuration. In fact, many features of the invention may be employed in engines that have only a single cylinder.

A piston 25 is supported for reciprocation in each cylinder bore 24. A piston pin 26 pivotally connects the piston 25 to the upper or small end of a connecting rod 27. The connecting rod 27 has its lower end (not shown for reasons described) journaled on a crankshaft in a conventional manner.

A cylinder head assembly, indicated generally by the reference numeral 28, is affixed to the cylinder block 22 in sealing relationship around the cylinder bore 24. The cylinder head assembly 28 is provided with individual recesses 29 formed in its lower surface which cooperate with the cylinder bore 24 and the head of the piston 25 to define the variable volume chamber of the engine. Each of these chambers comprises a combustion chamber, as is well known in this art. At times the recess 29 itself will be referred to as the combustion chamber because at top dead center position, substantially all of the volume of the combustion chamber is made up by this recess.

On one side of a plane containing the axis of the cylinder bore 24, this axis being identified by the reference numeral 31 in certain of the figures, the cylinder head 28 is provided with an induction passage arrangement, indicated generally by the reference numeral 32. This induction passage arrangement 32 is comprised of an inlet opening 33 formed in an outer surface 34 of the cylinder head assembly 28.

An intake manifold throttle body or the like is adapted to be affixed to the cylinder head surface 34 for delivering a fresh air charge to the induction system inlet opening 33. The inlet opening 33 is divided into a pair of side branch sections 35 and a center section 36 by internal walls 37 of the cylinder head. The side branch sections 35 terminate in side intake valve seats 38 while the center section 36 terminates in a center intake valve seat 39.

Figure 9:
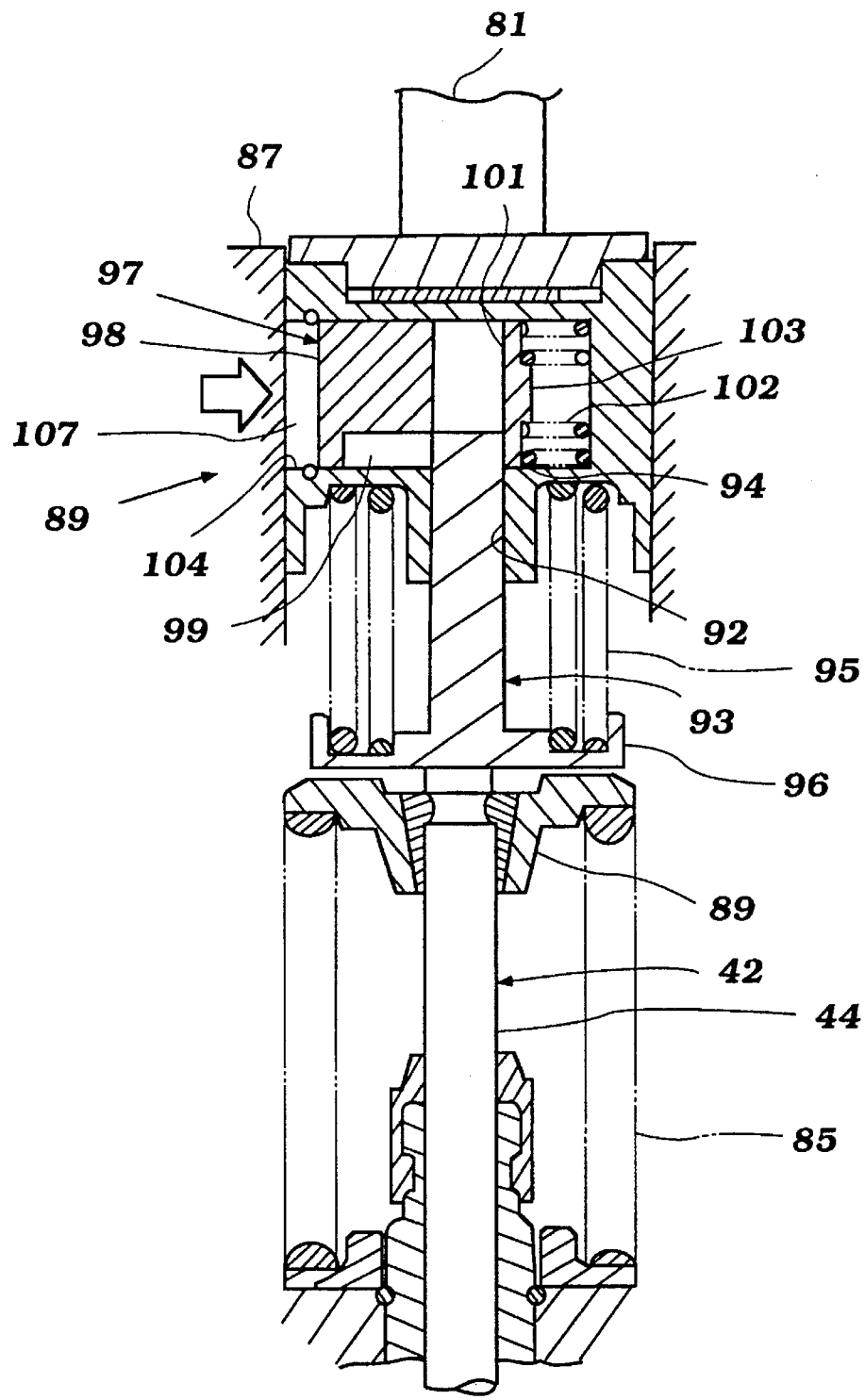
FIG. 9 is a cross-sectional view taken along the line 9—9 of FIG. 8.

The arrangement of these seats 38 and 39 may be best understood by reference to FIG. 9, which shows their relationship to the cylinder bore axis 31 and the aforenoted plane, indicated by the reference numeral 41 in this figure. It will be seen that the side intake valve seats 38 extend partially over the plane 41 onto the exhaust side of the cylinder head recess 29. These seats are, in this embodiment, disposed so that their centers lie at a distance $L_1$ from the plane 41 and are generally aligned with each other.

The center intake valve seat 39 is, on the other hand, disposed at a greater distance $L_2$ from this plane than this distance $L_1$. Its peripheral edge is, however, disposed further from the periphery of the cylinder bore 24 and recess 29 so as to nest in part between the side intake valve seats 38.

A pair of poppet-type side intake valves, each indicated generally by the reference number 42, have respective head portions 43 that cooperates with the valve seats 38 for controlling the flow therethrough. The poppet-type valves 42 have stem portions 44 that are slidably supported in the cylinder head assembly 28, for example by means of valve guides shown but not identified by reference numerals. This support defines a respective reciprocal axis 45, which axis lies in a common plane which is disposed at an acute angle $\theta_s$ to the aforenoted plane containing the cylinder bore axis 31 as best shown in FIG. 1. The opening and closing of the side intake valves 42 will be described later by primary reference to FIGS. 7–9.

In a similar manner, there is provided a single center poppet-type intake valve, indicated generally by the reference numeral 46 which has a head portion 47 that controls the flow through the center valve seat 39. This poppet-type valve 6 has a stem portion 48 which is also slidably supported in the cylinder head assembly 29 by a valve guide which is shown but not numbered. This valve reciprocates about an axis 49 which lies at an acute angle $\theta_c$ to the plane containing the cylinder bore axis 31 as is also shown in FIG. 1. The angle $\theta_c$ is less than the angle $\theta_s$.

Figure 5:
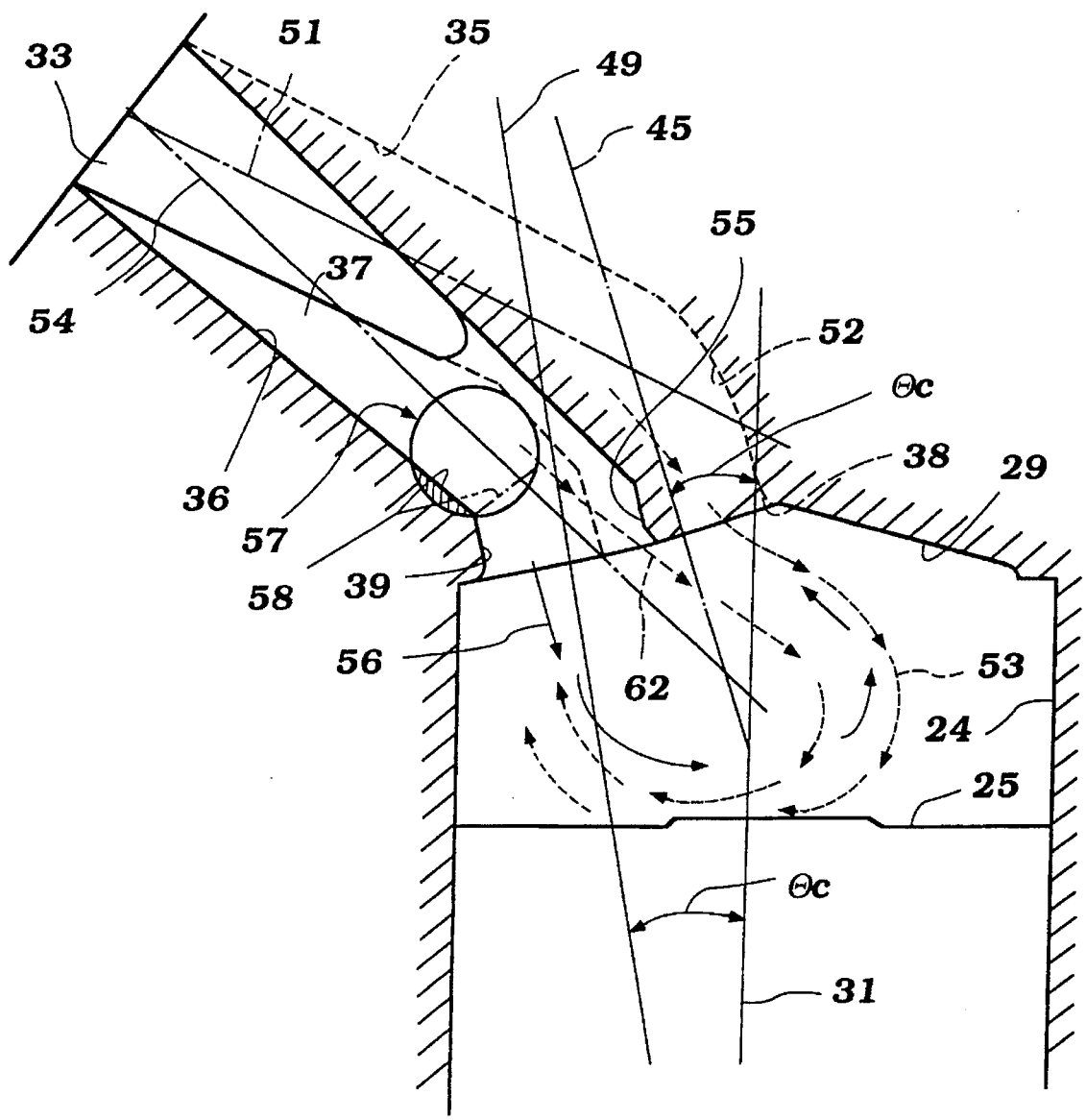
FIG. 5 is a cross-sectional view, in part similar to FIG. 1, and shows the various flow patterns that can be obtained in the combustion chamber.
Figure 6:
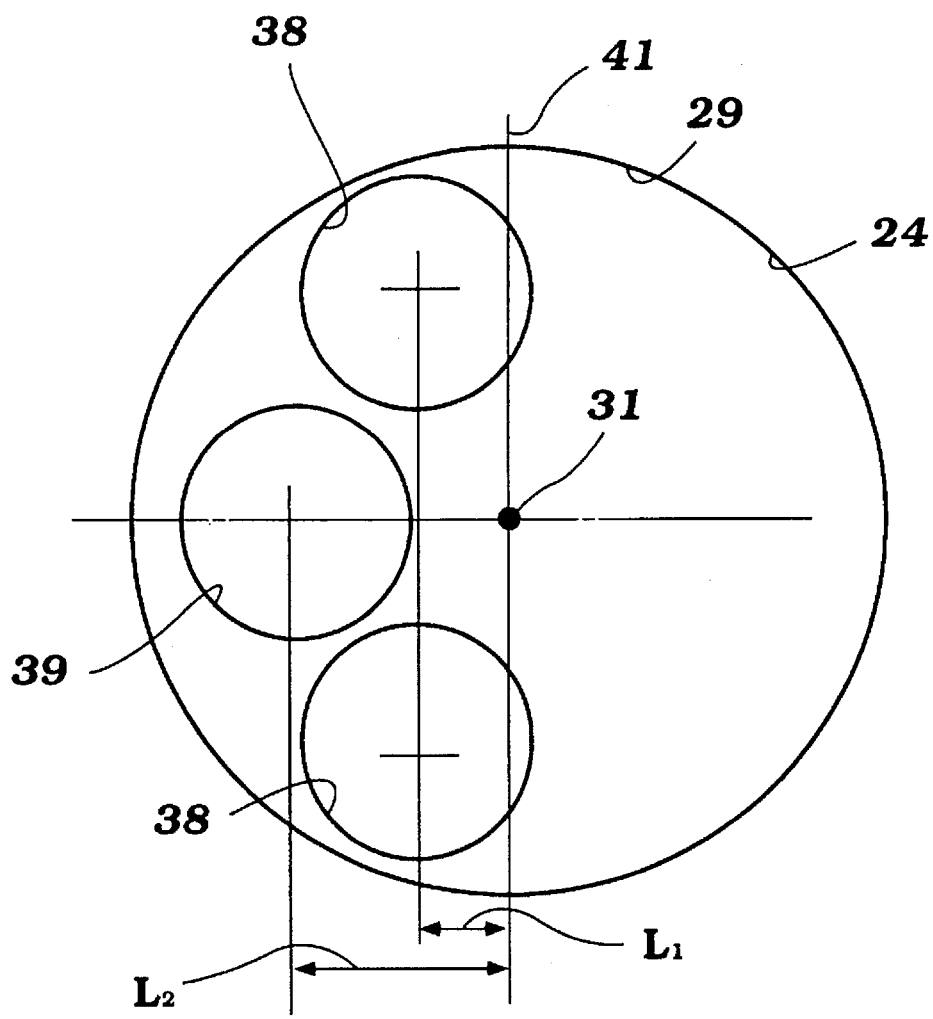
FIG. 6 is a bottom plan view of the combustion chamber to show the placement of the intake valves.

As best seen in FIG. 5, the side intake passages 35 have a generally centrally extending flow path axis 51 which is disposed at an angle to the plane containing the cylinder bore axis 31 that is substantially greater than that of the valve stem axis 45. The end of the intake passage portions 35 extending to the valve seats 38 is, therefore, turned through an angle 52 so as to redirect the flow charge from the side intake passages 35 into the combustion chamber in a generally axial, but downwardly sloping direction toward the opposite side of the cylinder bore 24. This flow will be redirected by contact with the cylinder bore 24 toward the head of the piston 25 to create a tumble action as shown by the broken line arrows 53 in FIG. 5. This tumble motion is augmented, under some circumstances, in a manner which will be described.

The center intake passage portion 36 has its flow axis 54 disposed at a lesser angle to the plane containing the cylinder bore axis 31 than the flow axis 51 of the side intake passages 35. In addition, the area adjacent the valve seat 39 is formed with a more steeply inclined portion 55 so that the charge issuing into the combustion chamber 29 through the valve seat 39 will flow generally axially downwardly as indicated by the solid line arrow 56. This flow will be directed somewhat at an angle to the head of the piston 25 so as to generate a tumble motion as shown by the arrows 56 which tumble motion is in the opposite direction to and opposes the tumble motion 53 from the side intake passages 35.

In order to control the effect of this counter-tumble motion, there is provided a control valve assembly, indicated generally by the reference numeral 57. This control valve assembly 57 is mounted in a transversely extending bore 58 formed in the cylinder head 28 and which extends along an axis that is generally parallel to the axis of rotation of the crankshaft. This axis is disposed outwardly of the cylinder bore axis 31 sufficiently so that the bore 58 only intersects the center intake passage 36 and lies below the side intake passages 35 as clearly shown in FIG. 5 and 7.

Figure 4:
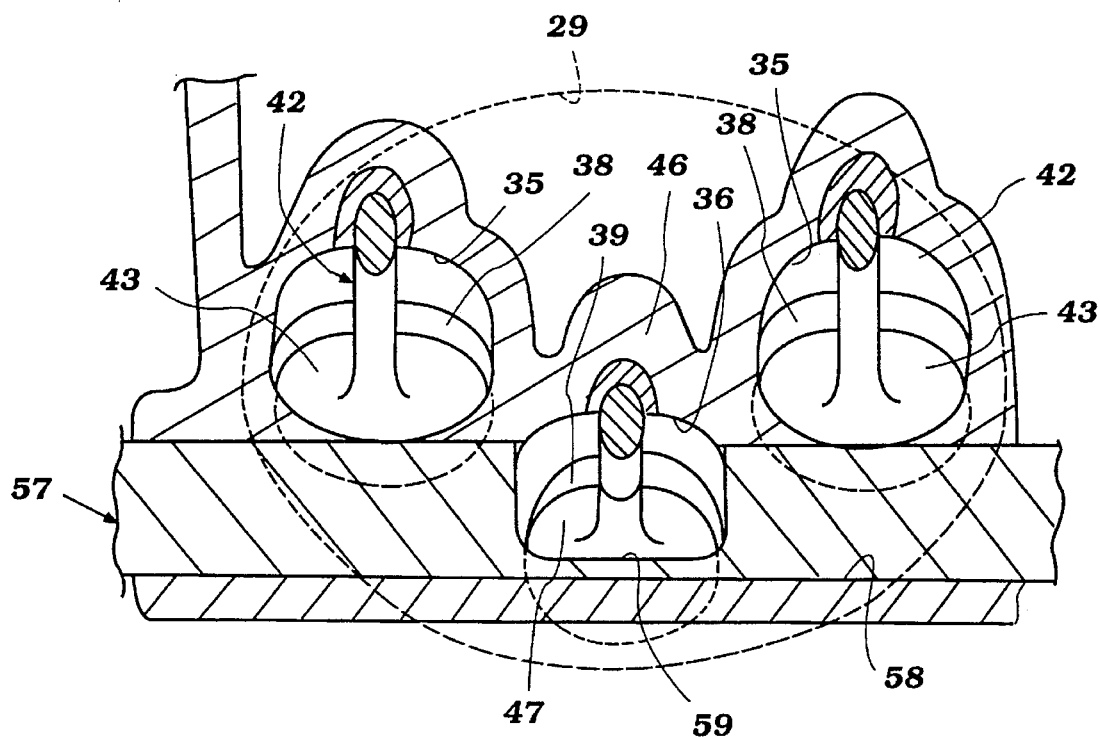

The control valve 57 has a generally cylindrical configuration with a cutout 59 formed therein which cutout forms a continuation of the center intake passage 35 when the control valve 57 is in its fully opened non-restricting non-flow redirecting position as shown in this figure and as also shown in FIG. 4.

Figure 3:
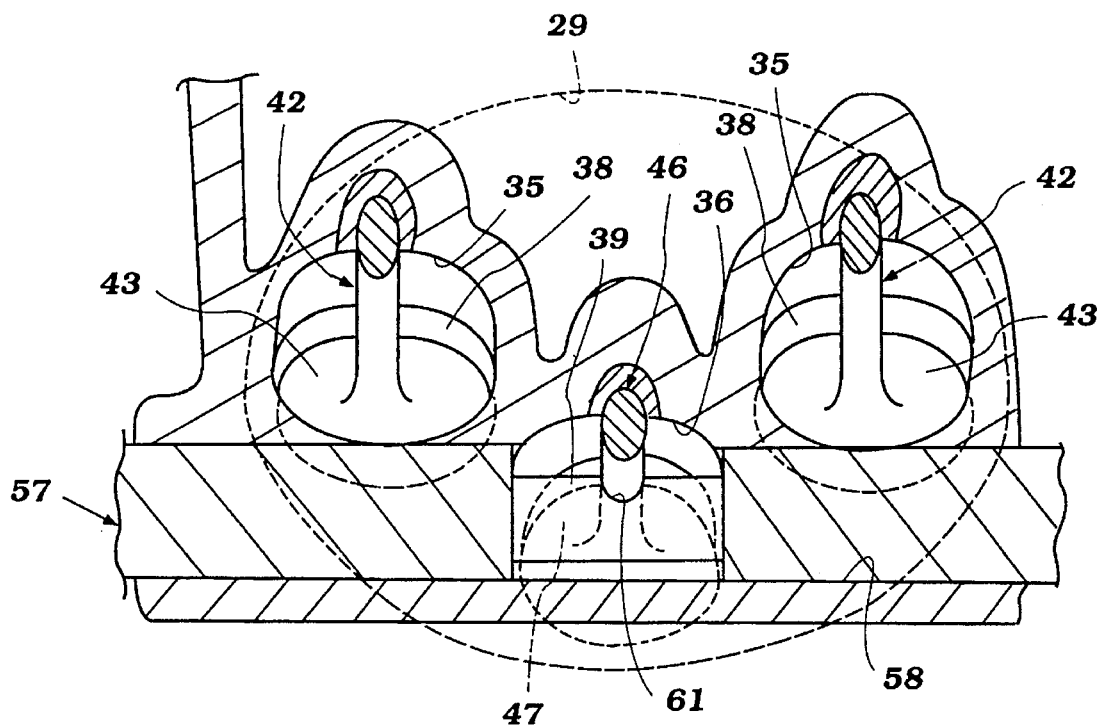
FIGS. 3 and 4 are enlarged cross-sectional views taken along the line 3—3 of FIG. 1.

The control valve portion 59 is provided with a small recess 61 so as to nest closely with the center intake valve stem 48 when in its closed flow redirecting position as shown in the phantom line view of FIG. 5 and in FIG. 3. In this position, the flow of the charge into the combustion chamber through the center intake passage 36 is redirected from that shown by the arrows 56 into the direction indicated by the arrow 62 in FIG. 5. In this position, the flow from the center intake passage 36 will be redirected more in a line with the axis 54 and toward the opposite side of the cylinder bore 24 so as to create a clockwise tumble as shown in FIG. 5 rather than the counterclockwise tumble indicated by the arrows 56. This clockwise tumble 62 will augment the tumble motion 53 from the side intake valve seats 38 and side intake passages 35 to promote a uniform tumble under some running conditions, as will be described later.

Figure 7:
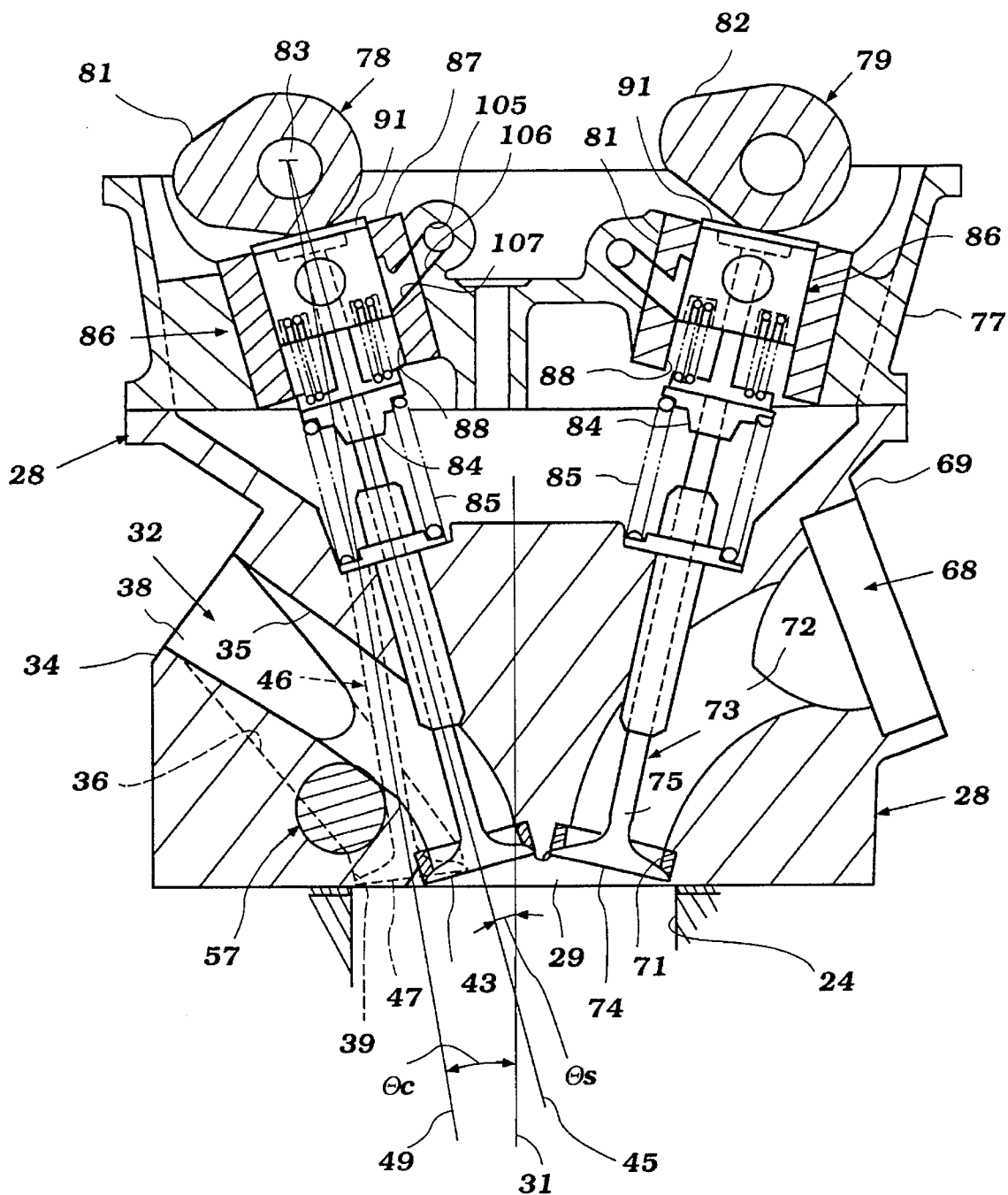
FIG. 7 is an enlarged cross-sectional view taken along a plane parallel to the plane of FIG. 1 and shows the side intake valves and the mechanism for controlling their opening and closing.
Figure 8:
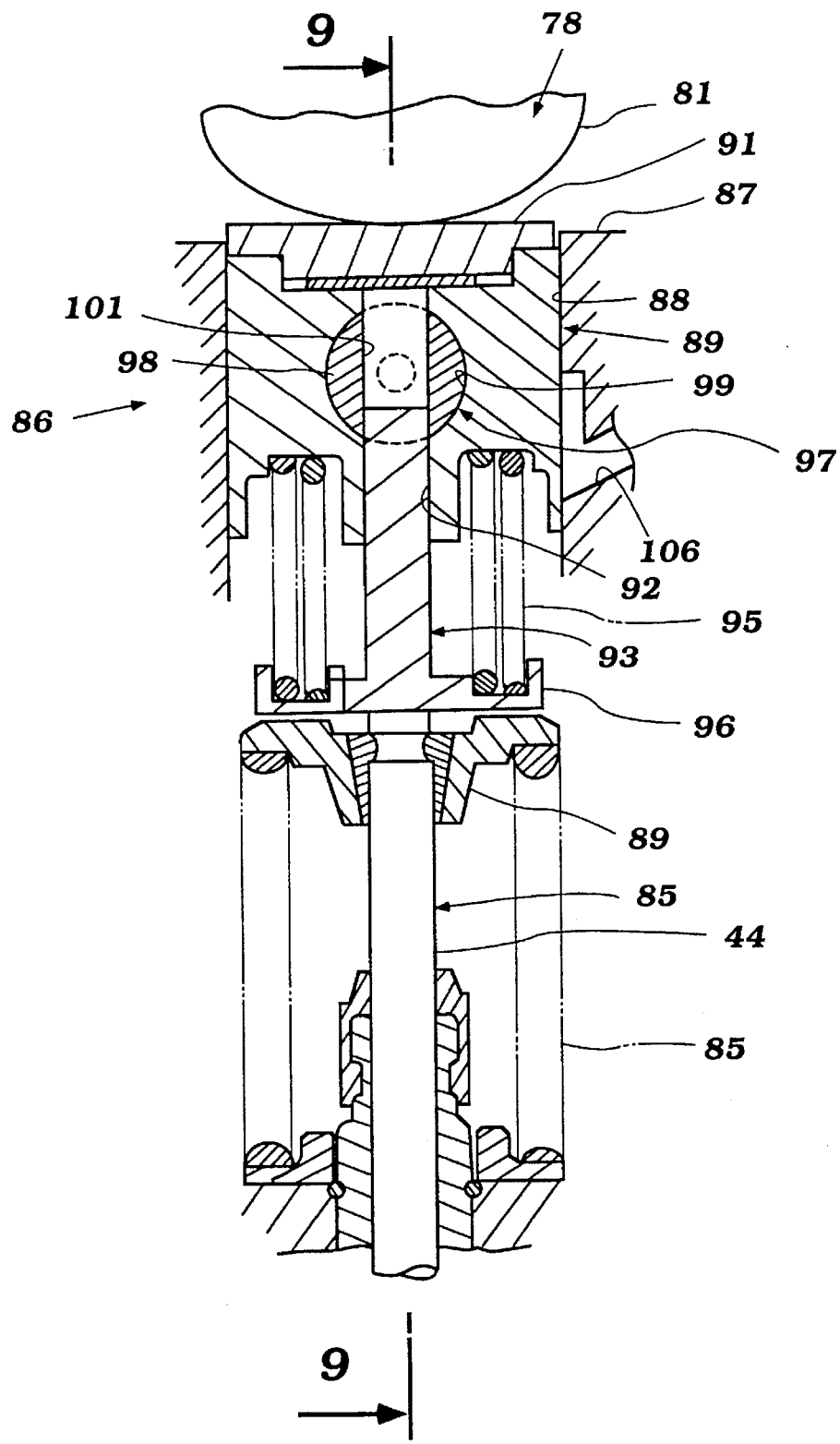
FIG. 8 is an enlarged cross-sectional view taken along the same plane as FIG. 7 and shows the mechanism for disabling the opening of one of the side intake valves.

The mechanism for operating the intake valves 42 and 46 will be described later primarily by reference to FIGS. 7–9 and this mechanism, as will become apparent, permits disabling of the side intake valves 42 so that they will not open and close or so that their opening and closing is restricted. Under this condition, the counterclockwise tumble action indicated by the arrow 56 will predominate, as also will be described.

Although the invention may be utilized with other forms of charge-forming systems, in the illustrated embodiment, the engine 21 is provided with electronically operated fuel injectors 63. These fuel injectors 63 may be of any conventional type and receive fuel from a fuel manifold 64. The injectors 63 have nozzle portions 65 that are mounted in the cylinder head 28 on the lower side of the intake passages 32 and specifically at the center thereof so as to be directed more toward the center intake valve seats 39. A port 66 is formed in the cylinder head so as to permit the spray pattern as shown by the broken arrows 67 to fan out and span the wall portions 37 so that some fuel can flow toward the intake portions 35. However, when the side intake valves 42 are disabled so that they will not open and close, there will not be significant airflow through the passages 35 while the airflow through the passage 36 will be accelerated. Hence, almost all of the fuel will be swept out of the center intake passage 36 under this running condition.

The exhaust system for the combustion chambers 29 will now be described and it is shown best in FIGS. 1, 2, and 7. This includes an exhaust passage, indicated generally by the reference numeral 68 which has an outlet opening formed in an outer surface 69 of the cylinder head 28. The surface 69 is disposed on the opposite side of the cylinder head from its inlet forming surface 34.

The exhaust passage 68 originates at a pair of exhaust valve seats 71 formed in the cylinder head surface 29 on the side of the plane 31 opposite the bulk of the intake valve seats 38 and 39. The valve seats 71 serve exhaust branch passages 72 formed in the cylinder head 68 and which merge into the common discharge opening in the surface 69. An exhaust manifold (not shown) is affixed to the cylinder head surface 69 so as to collect the exhaust gases and discharge them to the atmosphere.

Poppet-type exhaust valves 73 have head portions 74 that cooperate with the valve seats 71 for opening and closing them in a manner which will be described. These exhaust valves 73 have stem portions 75 which are supported in valve guides in the cylinder head 28. These valves 73 have their respective reciprocal axes lying in a common plane and which plane is disposed at an acute angle to the aforenoted plane containing the cylinder bore axis 31. This acute angle is equal to or greater than the acute angle $\theta_s$ of the side intake valves and is greater than that of the center intake valve $\theta_c$.

Figure 2:
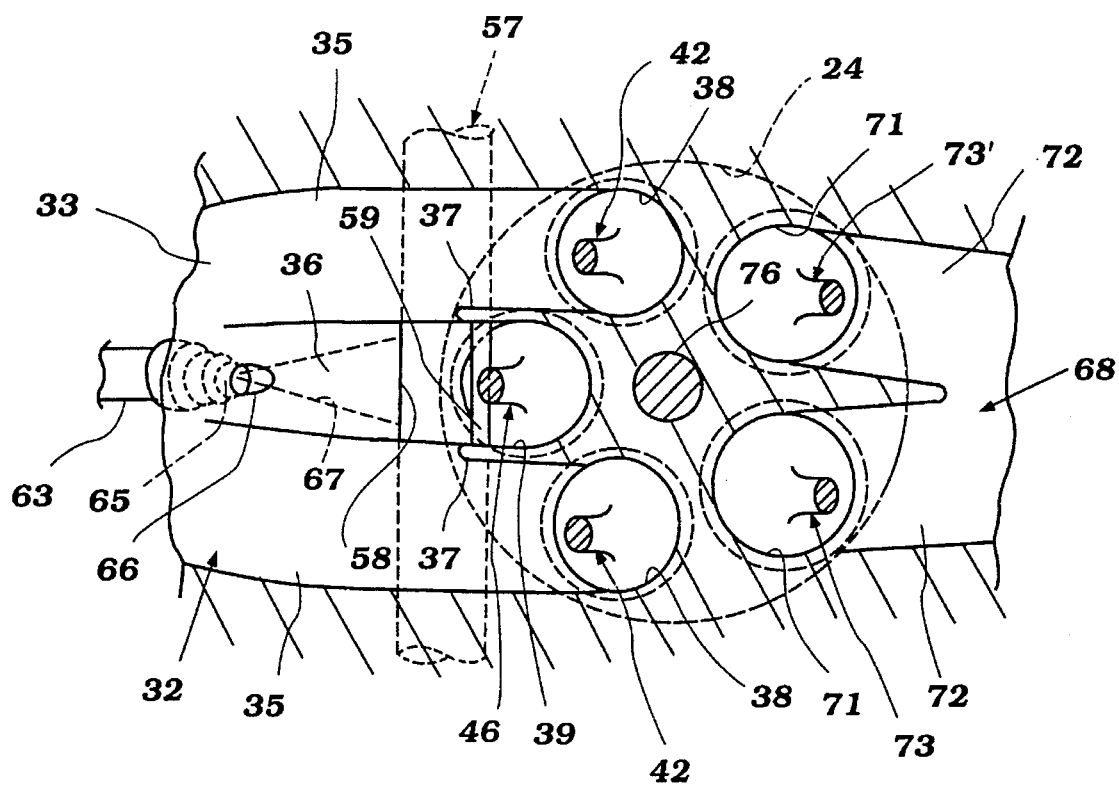
FIG. 2 is a cross-sectional view taken along the line 2—2 of FIG. 1.

A spark plug, shown partially in FIG. 2 and identified by the reference numeral 76 is mounted centrally in the cylinder head recess 29 with its gap disposed substantially on the cylinder bore axis 31. The spark plug 76 is fired by a suitable ignition system.

The system by which the intake valves 42 and 46 and exhaust valves 73 are opened and closed will now be described by primary reference to FIG. 7. This mechanism includes a cam tower 77 which is affixed to and forms a part of the cylinder head assembly 28 in any suitable manner. This cam tower 77 rotatably journals an intake cam shaft 78 and an exhaust cam shaft 79 in any known manner. The intake and exhaust cam shafts 78 and 79 are driven by the crankshaft of the engine through any suitable timing mechanism so that their rotational speed will be one-half that of crankshaft speed, as is well known in this art. Each of the camshafts 78 and 79 is provided with respective lobes 81 and 82 which cooperate, in a manner to be described, with respective of the valves 42, 46, and 73 for their operation.

It should be noted that the rotational axis 83 of the intake cam shaft 78 is disposed so as to lie along a line which is intersected by the planes containing the reciprocal axes 45 and 49 of the intake valves 42 and 46, respectively. The rotational axis of the exhaust cam shaft 79 is disposed so that it is in line with the axis of rotation of the exhaust camshaft 79.

A keeper retainer assembly 84 is affixed in a known manner to the upper end of the stems 44 and 48 of the intake valves 42 and 46 and the stems 75 of the exhaust valves 73. A coil compression spring 85 is loaded between each keeper retainer assembly 85 and a surface of the cylinder head 28 for urging the respective valves 42, 46, and 73 to their closed position so that their heads 43, 47, and 74 will be in seating and sealing engagement with the respective valve seats 38, 39, and 71, as is well known in this art.

A tappet assembly, indicated generally by the reference numeral 86 is interposed between each cam lobe 81 and 82 and its respective actuated valve. These tappet assemblies 86 are designed and constructed in a manner which will be described additionally by reference to FIGS. 8 and 9 and which permits selective disabling of the opening and closing of the respective valve. This construction has primary utility in conjunction with controlling the opening of the side intake valves 42 but such a mechanism may be employed with the remaining center intake valve 46 and one or both of the exhaust valves 73 in a manner which will be described.

Because the selectively disabling tappet assembly 86 has primary utility with the side intake valve 42 it will be described by particular reference in association with such valve. However, and as has been noted, this arrangement may be utilized with each or selected ones of all of the valves 42, 46, and 73.

The cam tower 77 is provided with a bore that receives an insert piece 87. The insert piece 87, itself, forms a bore 88 that slidably receives a tappet body 89. The upper end of the tappet body 89 is formed with a recess in which an adjusting shim 91 may be positioned so as to adjust the clearance between the cam lobes 81 and the tappet bodies 89 for reasons well known in this art.

The tappet body 89 is formed with a bore 92 which is generally aligned with the stem 44 of the associated valve 42. A valve actuating plunger, indicated generally by the reference numeral 93, has a shank portion 94 that is slidably supported within the bore 92. A coil spring assembly 95 is interposed between the lower end of the tappet body 89 and a headed portion 96 of the valve actuating plunger 93. This spring assembly 95 holds the headed portion 96 in engagement with the valve stem 84. The spring 95 is, however, of lesser preload and rate than the valve spring 85 for a reason which will become apparent.

A locking mechanism, indicated generally by the reference numeral 97 is provided for detachably coupling the tappet 89 for reciprocation with the valve actuating plunger 93 or disconnecting this connection. This locking member 97 includes a plunger 98 that is slidably supported within a bore 99 formed in the tappet body 89 and which intersects its bore 92. This locking plunger 98 has its own bore 101 which is of a diameter equal to or larger than the bore 92 and larger than the diameter of the shank portion of the valve actuating plunger 93. A pair of coil compression springs 102 are received in the blind end of the bore 99 and engage a head 93 of the locking plunger 99 so as to normally urge it outwardly as shown in FIG. 9 to engage a snap ring 104 formed in a groove in the outer end of the bore 99. In this position, the locking member bore 101 is aligned with the tappet bore 79 and the shank of the plunger 93.

In this condition, when the cam lobe 81 engages the adjusting shin 91 and urges the tappet body 89 downwardly in a valve opening direction, the spring 95 will yield, it being remembered that the spring has a lower rate and preload than the valve spring 85. Hence, the tappet body 89 will reciprocate relative to the valve actuating plunger 93 and the respective valve 42 so that the valve will not be opened and closed. Hence, the respective passage served by the disabled valve will remain closed during the engine running under this time.

In the illustrated embodiment, a hydraulic arrangement is provided for actuating the plunger 97 so that it will move into a position to engage the stem 94 of the valve actuating plunger 93. This is done by providing a pressure manifold 105 in the cam carrier 77 which, in turn, has selective cross drillings 106 that communicate with delivery passages 107 formed in the insert pieces 87. These delivery passages 106 are disposed so as to communicate with the outer peripheral edge 107 of the bore 99 and act upon the plunger 97 for urging it in a direction to bring its bore 103 out of registry with the plunger shank 94. In this condition, when the cam 91 engages the shim 91 and urges the tappet body 89 in an axial direction, the plunger 97 will contact the valve actuating plunger 93 and cause the respective valve to open and close in its normal fashion.

As has been noted, this type of arrangement may be provided with all or some of the valves. Where it is desired not to disable the valve, either the insert body 87 and tappet 89 may be replaced with a conventional tappet or the tappet body 89 may be provided with a fixed plunger that will always engage the valve actuating member 93. Any of a wide variety of devices can be employed for providing this positive operation under all conditions.

The actual mode of operation of the entire engine will now be described by primary reference to FIG. 5. The control routine which will be described is only one which is capable of use in conjunction with the invention. Those skilled in the art will readily understand how the control routine will be varied to suit the particular requirements of certain engines to achieve certain performance characteristics.

It should be noted that the control valve 57 has its shaft extending outwardly beyond one end of the cylinder head 28 where it is coupled to a suitable servo motor for moving it between the open non-flow restricting and redirecting position shown in the solid line view and the closed flow restricting and flow redirecting position as shown in the phantom lines in this figure.

Under low-speed, low-load conditions, the control valve 57 is placed in the condition shown in solid lines and the side intake valves 42 are disabled so that they will not open and close. Hence, the intake charge admitted to the combustion chamber will flow totally through the center intake passage 36 through the center intake valve seat 39 in the direction shown by the solid line arrows 56 to generate a counterclockwise tumble action. Because of the fact that all of the flow is through this passage the flow will still be at a relatively high velocity since the actual effective flow area is quite small.

When operating under high-speed, high-load conditions, the control valve 57 is rotated to the phantom line view shown in FIG. 5 and the side intake valves 42 are enabled so that they will open and close. Hence, the flow will be in the direction of the arrow 62 and 53 in this figure.

Hence, in this condition, the tumble action generated by the center intake passage 37 and its valve seat 39 will reverse from the previous condition and create a clockwise tumble which augments the tumble 53 from the side intake passages 35 and their valve seats 38. This augmented tumble will not provide any significant flow restriction to the intake charge and hence high volumetric efficiencies can be obtained. That is, this tumble is provided primarily by the offsetting of the side intake valve seats 39 toward the exhaust side of the cylinder bore axis 31 rather than through any substantial flow redirecting device.

At the same time, the flow through the center intake valve seat 39 and its center intake passage 36 will be somewhat restricted and redirected so as to cause no counterflow that can be detrimental to engine operation.

In intermediate running conditions, the side valves 42 may be enabled at a time when the control valve 57 is still in its open position. Alternatively, this control valve 57 may be opened again at wide open high-speed, high-load conditions. As has been previously noted, many variations in this control routine may be provided depending upon the desired output of the engine. However, the important thing to note is that the arrangement permits the generation of tumble in either of two selected directions and augmenting of the tumble of the side valves by the center valve under some conditions or providing counter-tumble that will reduce the tumble action of the side valves if desired.

In the embodiment of the invention as thus far described, the invention has been embodied in an engine having three intake valves per cylinder and two exhaust valves. The invention has particular utility in conjunction with engines having three intake valves per cylinder because this facilitates the positioning of the valve seat at different distances from the plane containing the cylinder bore axis so as to generate the clockwise and counterclockwise tumble motions as aforedescribed. The use of three intake valves per cylinder permits also the tumble motion to be generated when the side intake valves are operative to be fairly uniform across the combustion chamber. There may be some instances, however, when it is desirable to provide a so-called "slant tumble" operation and this can be accomplished with a three-valve per cylinder engine by disabling only one of the side intake valves under some running conditions.

Many of these effects can be achieved, however, by using a number of valves other than three intake valves, and next will be described some embodiments of such arrangements. Since the only difference is the number of valves and their valve placement, only this portion of the engines will be described. It is believed that the foregoing description will enable those skilled in the art to understand how the invention can be practiced with these alternative valve placements.

Figure 10:
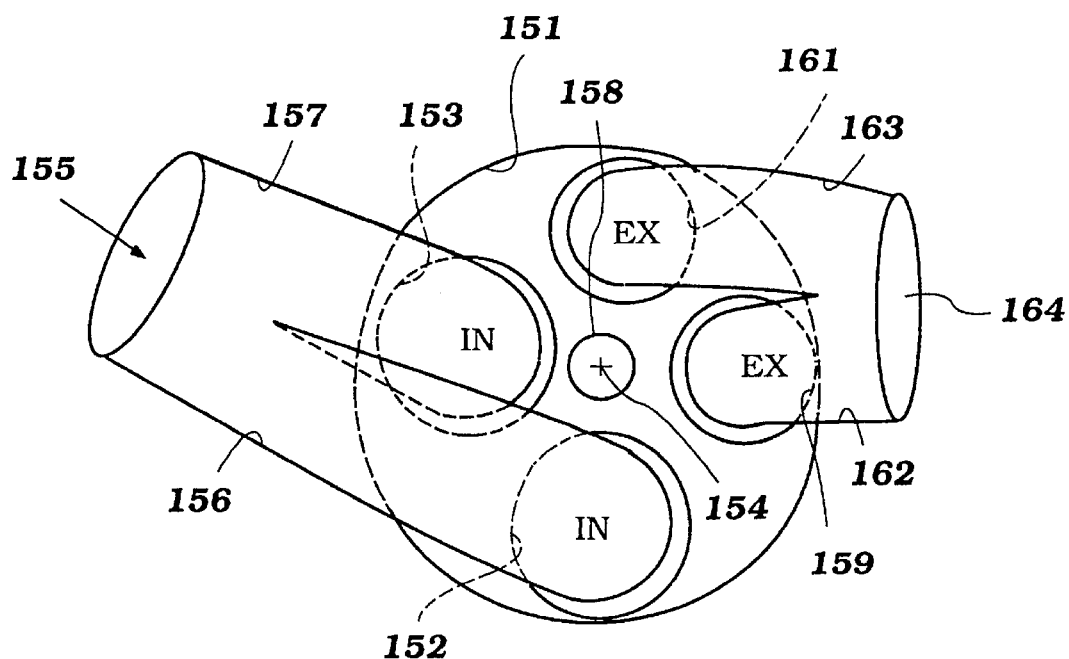
FIG. 10 is a partially schematic top plan view showing another embodiment of the invention.

Referring first to FIG. 10, there is shown a view which is partially similar to FIG. 2 but wherein the combustion chamber recess, indicated by the number 151, is provided with first and second intake valve seats 152 and 153. The first intake valve seat 152 lies closer to the center axis 154 of the cylinder bore and recess 151, and hence corresponds to the one side valve of the previously described embodiment. The remaining intake valve seat 153 is further from this plane and hence operates like the center intake valve seat of the previously described embodiment.

A single Siamesed-type intake passage, indicated generally by the reference numeral 155, branches into a first portion 156 which serves the valve seat 152 and a portion 157 which serves the valve seat 153. The control valve previously described would be positioned in the branch passage 157, and the operation of the intake valve that controls the flow through the intake valve seat 152 can be selectively disabled in accordance with the mechanism previously described.

Thus, under low-speed, low-load conditions, the intake valve associated with the valve seat 152 can be disabled and the control valve held open so that a counterclockwise tumble motion will be generated by the flow through the valve seat 151. Under high-speed, high-load conditions, the valve associated with the valve seat 152 is enabled, and the control valve is closed in the passage 157 so as to augment the clockwise tumble action. Because this action occurs primarily on one side of the cylinder bore 151, a slant clockwise tumble action will be generated.

Because of the central positioning of a spark plug 158, some form of stratification can be achieved under low-speed, low-load conditions since the intake valve seat 153 and tumble action will be in the same general area as the spark plug 158. Under the high-speed, high-load conditions, mixing will be achieved so that a homogenous mixture will be present in the combustion chamber.

In this embodiment there are provided a pair of exhaust valve seats 159 and 161 that serve respective portions 162 and 163 of a Siamesed-type exhaust passage 164. The staggering of the exhaust valve seats 159 and 161 permits the use of larger valves, with the exhaust valve seat 161 being positioned in general alignment with the intake valve seat, 152 and the exhaust valve seat 159 being positioned generally in alignment with the intake valve seat 153.

Figure 11:
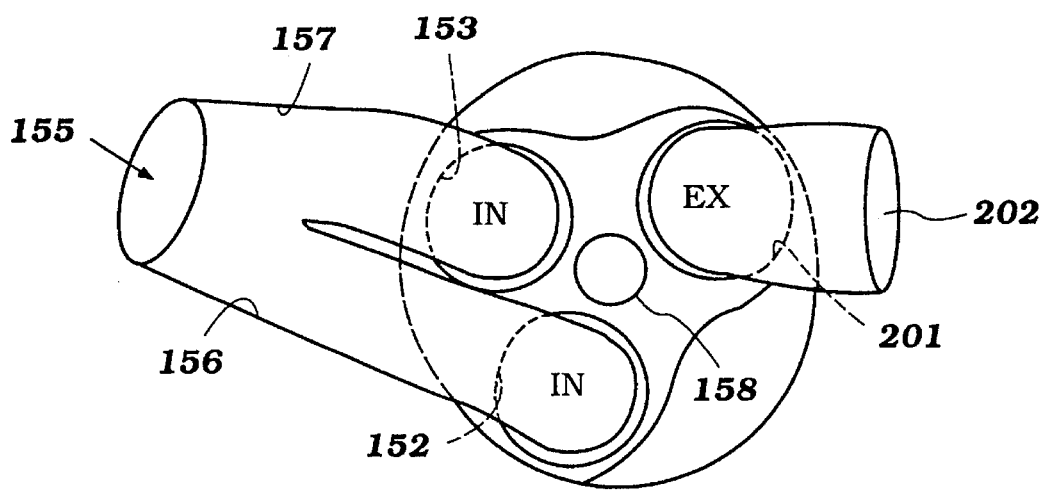
FIG. 11 is a partially schematic top plan view showing a still further embodiment of the invention.

FIG. 11 shows an embodiment which is similar to FIG. 10 but uses only a single exhaust valve seat 201 that serves a single exhaust passage 202. In other regards, this construction is the same as that previously described, and for that reason, additional description of this embodiment is not believed to be necessary, and components of this embodiment which are the same as the embodiment of FIG. 10 have been identified by the same reference numerals.

Figure 12:
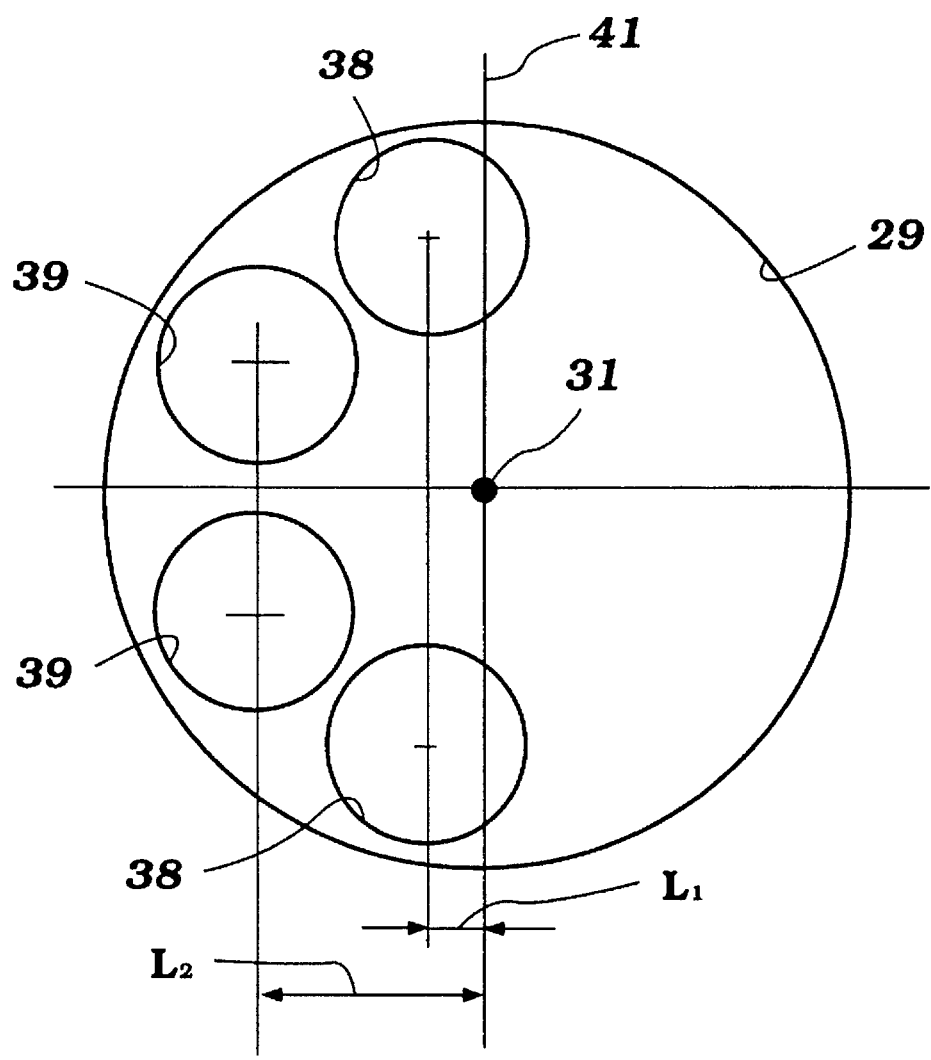
FIG. 12 is a plan view, in part similar to FIG. 6, and shows yet another embodiment of the invention.

FIG. 12 is a view of another embodiment which employs four intake valves per cylinder, and thus is similar to the embodiment of FIGS. 1–9. However, this utilizes two center intake valve seats 39 in addition to the two side valve seats 38. Since this is the only basic difference, the components have been numbered by the same reference numerals applied in FIGS. 1–9. In this embodiment the center of the side intake valve seats 38 are disposed at the distance L1 to the plane 41 containing the cylinder bore axis. The centers of the center intake valve seats 39 are located at the distance L2. In this embodiment the distance L1 is less than that of the previously described embodiment, while the distance L2 may be greater. In this embodiment the control valve controls the flow through both of the center intake valve seats 38, and the intake valves associated with the side intake valve seats 38 may both be disabled.

Hence, from the foregoing description it should be readily apparent that the described embodiments of the invention are effective in providing desired and substantially different flow patterns in the combustion chamber under various engine operating conditions. Of course, the embodiments described are only preferred embodiments, and various changes and modifications may be made without departing from the spirit and scope of the invention, as defined by the appended claims.

I claim:

1. An internal combustion engine having a cylinder block defining a cylinder bore, a piston reciprocating in said cylinder bore, a cylinder head closing said cylinder bore and forming at least in part a combustion chamber with said cylinder bore and said piston, a first intake passage extending through said cylinder head and terminating in a first valve seat, a second intake passage extending through said cylinder head and terminating in a second valve seat, said first intake passage being disposed to create a first flow pattern in said combustion chamber, said second intake passage and said second valve seat being disposed to provide a second flow pattern different from said first flow pattern in said combustion chamber, and means for selectively disabling the flow through one of said valve seats under certain engine running conditions for controlling the flow pattern in said combustion chamber.

2. An internal combustion engine as in claim 1, further including control valve means in the second intake passage for redirecting the flow therethrough.

3. An internal combustion engine having a cylinder block defining a cylinder bore, a piston reciprocating in said cylinder bore, a cylinder head closing said cylinder bore and forming at least in part a combustion chamber with said cylinder bore and said piston, intake passage means for introducing at least an air charge into said combustion chamber, and control means cooperating with said intake passage means for selectively generating tumble within said combustion chamber in a first direction in one condition and in a second direction in another condition.

4. An internal combustion engine as in claim 3, wherein the control means controls the flow through the intake passage means in either of two directions.

5. An internal combustion engine as in claim 3, wherein the intake passage means comprises a pair of intake passages, each serving the combustion chamber and each oriented to effect a tumble action in a direction opposite to the other.

6. An internal combustion engine as in claim 5, wherein the control means includes means for selectively controlling the flow through each of the intake passages and a control valve for controlling the flow through one of the intake passages to direct it in first and second directions.

7. An internal combustion engine as in claim 6, wherein the control valve directs the flow through the respective intake passage in the same direction as through the other intake passage in its second position.

8. An internal combustion engine as in claim 5, wherein the direction through one of the intake passages generates a tumble in a first direction in the combustion chamber.

9. An internal combustion engine as in claim 8, wherein the flow through the other intake passage generates a tumble in the combustion chamber in the opposite direction from that of the first intake passage.

10. An internal combustion engine as in claim 9, wherein the control means includes a control valve directing the flow through the other intake passage to change it into a tumble flow in the opposite direction.

11. An internal combustion engine as in claim 5, wherein there is further provided a third intake passage communicating with the combustion chamber through a third valve seat.

12. An internal combustion engine as in claim 11, wherein two of the valve seats comprise side valve seats having their centers disposed closer to a plane containing the axis of the cylinder bore and the third valve seat comprises a center valve seat having its center disposed further from said plane.

13. An internal combustion engine as in claim 12, wherein the side intake valve seats are disposed so as to create a clockwise tumble in the combustion chamber, and the center valve seat is disposed so as to generate a counterclockwise tumble in the combustion chamber.

14. An internal combustion engine as in claim 13, wherein the control means selectively disables the operation of the opening and closing of the side intake valve seats in response to a first condition and redirects the flow through the center valve seat and enables the opening and closing of the side valve seats in response to a second condition, the redirection of the flow through the center intake valve seat being effective to create a clockwise tumble motion.

15. An internal combustion engine as in claim 3, wherein the control means effects the change in flow direction in response to an engine running condition.

16. An internal combustion engine as in claim 15, wherein the flow in one direction is under the low-speed, low-load condition.

17. An internal combustion engine as in claim 16, wherein the flow in the other direction is a high-speed, high-load condition.

18. An internal combustion engine as in claim 17, wherein the control means controls the flow through the intake passage means in either of two directions.

19. An internal combustion engine as in claim 17, wherein the control valve means effects the change in flow direction in response to an engine running condition.

20. An internal combustion engine as in claim 19, wherein the flow in one direction is under the low-speed, low-load condition.

21. An internal combustion engine as in claim 20, wherein the flow in the other direction is a high-speed, high-load condition.

22. An internal combustion engine as in claim 17, wherein the intake passage means comprises a pair of intake passages, each serving the combustion chamber and oriented to effect a tumble action in an opposite direction.

23. An internal combustion engine as in claim 22, wherein the control means includes means for selectively controlling the flow through each of the intake passages and a control valve for controlling the flow through one of the intake passages to direct it in first and second directions.

24. An internal combustion engine as in claim 23, wherein the control valve directs the flow through the respective intake passage in the same direction as through the other intake passage in its second position.

25. An internal combustion engine as in claim 22, wherein the direction through one of the intake passages generates a tumble in a first direction in the combustion chamber.

26. An internal combustion engine as in claim 25, wherein the flow through the other intake passage generates a tumble in the combustion chamber in the opposite direction from that of the first intake passage.

27. An internal combustion engine as in claim 26, wherein the control valve directs the flow through one of the intake passages to change it into a tumble flow in the opposite direction.

* * * * *